(12) United States Patent
Britt et al.

(10) Patent No.: US 11,861,133 B1
(45) Date of Patent: *Jan. 2, 2024

(54) APPARATUS AND METHODS OF ANALYZING STATUS OF COMPUTING SERVERS

(71) Applicant: 8x8, Inc., Campbell, CA (US)

(72) Inventors: Timothy Britt, Campbell, CA (US);
Bryan Martin, Campbell, CA (US);
Christopher Peters, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/074,174

(22) Filed: Dec. 2, 2022

Related U.S. Application Data

(63) Continuation of application No. 17/499,152, filed on Oct. 12, 2021, now Pat. No. 11,526,249, which is a continuation of application No. 17/131,241, filed on Dec. 22, 2020, now Pat. No. 11,146,461, which is a continuation of application No. 16/512,993, filed on (Continued)

(51) Int. Cl.
*G06F 3/048* (2013.01)
*H04L 43/045* (2022.01)
*H04L 43/0817* (2022.01)
*H04L 41/22* (2022.01)

(52) U.S. Cl.
CPC .............. *G06F 3/048* (2013.01); *H04L 41/22* (2013.01); *H04L 43/045* (2013.01); *H04L 43/0817* (2013.01)

(58) Field of Classification Search
CPC ....................................................... G06F 3/048
See application file for complete search history.

(56) References Cited

U.S. PATENT DOCUMENTS

| | | | |
|---|---|---|---|
| 2012/0120078 A1* | 5/2012 | Hubbard | G06F 11/3055 345/440.2 |
| 2015/0229546 A1* | 8/2015 | Somaiya | H04L 67/10 715/736 |

* cited by examiner

*Primary Examiner* — Roland J Casillas
(74) *Attorney, Agent, or Firm* — Crawford Maunu PLLC

(57) ABSTRACT

Various example implementations are directed to apparatuses and methods for providing data communications, and for monitoring and/or analyzing operations of computing data-communication servers. According to an example embodiment, an apparatus includes processing circuitry to generate graphical-user data and further includes cloud-based data-communication servers. The cloud-based data-communication servers are to provide over one or more broadband networks including the Internet, data-communication services to recipients having respective accounts associated with use of the data-communication services and, for one or more of the accounts, to allow the recipients to permit the recipients to designate, for provisioning and/or deploying, certain of the one or more resources which are available from the system. In connection with the one or more resources, the graphical-user data includes information to display a timeline having a graphical indication corresponding to an operating state for a corresponding time period and further to display graphical markers which are aligned visually to indicate comparisons between two of more of the following: network-side events affecting multiple servers, server-side events affecting only a single server, and user-side events affecting a single user.

20 Claims, 3 Drawing Sheets

Related U.S. Application Data

Jul. 16, 2019, now abandoned, which is a continuation of application No. 14/505,061, filed on Oct. 2, 2014, now Pat. No. 10,355,943.

(60) Provisional application No. 61/983,792, filed on Apr. 24, 2014, provisional application No. 61/975,295, filed on Apr. 4, 2014.

US 11,861,133 B1

APPARATUS AND METHODS OF ANALYZING STATUS OF COMPUTING SERVERS

OVERVIEW

Computing servers are increasingly being used to provide various services over a network including, but not limited to, website hosting, remote data storage, remote computing services, virtual computing environments, and communication services such as Voice-over-IP (VoIP), video conferencing, call exchange servers, packet switching, and traffic management. For ease of reference, the various applications, systems and services that may be provided by computing servers may be collectively referred to as remote services.

SUMMARY

Various example implementations are directed to circuits, apparatuses, and methods for monitoring and/or analysis of computing servers. According to an example embodiment, an apparatus includes a processing circuit communicatively coupled to a plurality of servers via a network. The processing circuit includes an analysis circuit configured to retrieve operating state data for the plurality of servers. The analysis circuit determines an operating state of each of the plurality of servers for a plurality of time periods. The determined operating state is one of three states including an up state, a warning state, and a down state. The processing circuit also includes an interface circuit configured to provide a graphical user interface (GUI). For each of the servers, the GUI displays a timeline having a respective time block for each of the plurality of time periods. Each time block has a graphical indication of one of the three states of operation corresponding to the operating state of the server at the corresponding time period.

In another example embodiment, a method is provided for monitoring a plurality of servers. Operating state data is retrieved for the plurality of servers. For a plurality of time periods, an operating state of each server is determined. The determined operating state is being one of three states including an up state, a warning state, and a down state. A GUI is provided that displays a timeline for each of the servers. The timelines each have a respective time block for each of the plurality of time periods. Each time block has a graphical indication of one of the three states of operation corresponding to the operating state of the server at the corresponding time period.

In another example embodiment, an apparatus includes a processing circuit communicatively coupled to a plurality of servers via a network. The processing circuit includes a first circuit means for retrieving operating state data for the server and for determining an operating state of each of the plurality of servers for a plurality of time periods. The determined operating state of each server is one of three states including an up state, a warning state, and a down state. The processing circuit includes a second circuit means for providing a GUI. The GUI is configured to display a respective timeline for each server of the plurality of servers. The timelines have a respective time block for each of the plurality of time periods. Each time block has a graphical indication of one of the three states of operation corresponding to the operating state of the server at the corresponding time period.

The above discussion/summary is not intended to describe each embodiment or every implementation of the present disclosure. The figures and detailed description that follow also exemplify various embodiments.

BRIEF DESCRIPTION OF THE DRAWINGS

The disclosure may be more completely understood in consideration of the following detailed description of various embodiments of the disclosure in connection with the accompanying drawings, in which.

Figure 1:
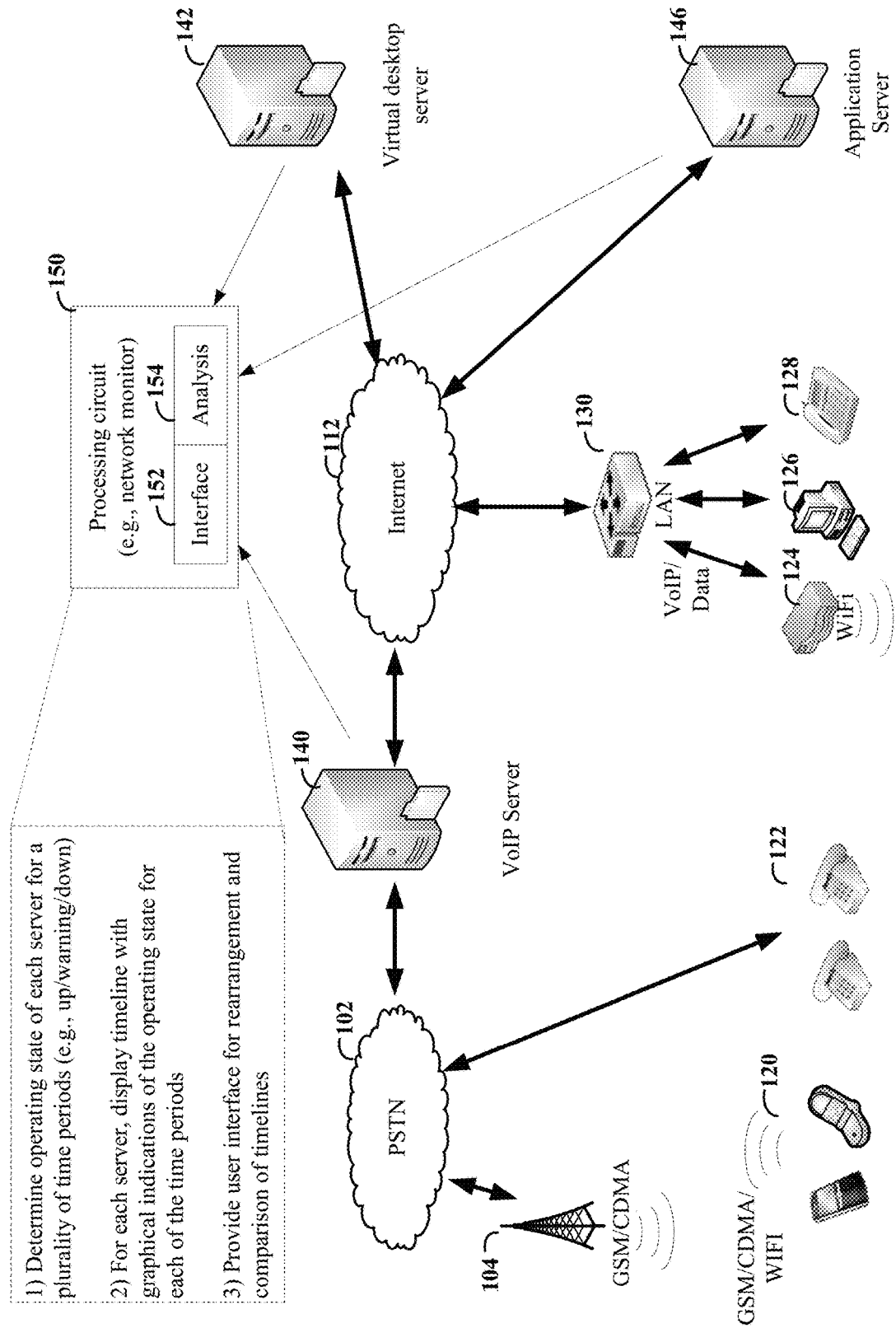
FIG. 1 shows an example network architecture with network monitor.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of apparatuses, systems, and methods involving computing servers. While not necessarily so limited, various aspects may be appreciated through a discussion of examples within this context. Various example implementations are directed to circuits, apparatuses, and methods for monitoring and/or analysis of computing servers. The disclosed embodiments are applicable to various types of computing servers including physical and/or virtual servers, which may provide remote services including, for example, file servers, email servers, web hosting, domain name resolution and routing, virtual meeting services (e.g., VoIP), billing, and/or remote computing services (e.g., virtual desktops, virtual private servers, and/or virtual enterprise services). While the disclosed embodiments are not necessarily limited to such applications, various aspects of the present disclosure may be appreciated through a discussion of various examples in this context.

For example, in some embodiments, an apparatus includes a processing circuit configured to retrieve operating status data that describes the operational state of each of a plurality of computing servers. For a plurality of time periods, the processing circuit determines an operating state of each of the plurality of servers. For example, in some implementations, the determined operating state may be one of three states including an "up" state, a "warning" state, and a "down" state.

The processing circuit may use various criteria to determine whether a server is operating in the various operating states. In some implementations, a server is determined to be in the up state when the server is fully operational and in the down state when the server is non-responsive. The server may be determined to be in the warning state when the server is responsive, but exhibits one or more indications of incorrect operation or excessive load. As one example, a server may be identified by the processing circuit as operating in the warning state if a traffic load on the server exceeds a threshold value. As another example, a server may be identified as operating in the warning state if latency of the server exceeds a threshold value. As yet another example, a server may be identified as operating in the warning state if processing time or memory usage of the server exceeds a threshold value. Other criteria may additionally or alternatively be used.

Some implementations may use more or fewer operating states to categorize the operating states of a server. For example, multiple warning states may be used in addition to the up and down states. The different warning states may indicate the severity, number, or frequency of the indication(s) that the server is not operating correctly. For ease of explanation, the examples are primarily described with reference to the three operating states indicated above (i.e., up, warning, and down).

In some embodiments, an apparatus includes a processing circuit configured to provide a graphical user interface (GUI) for display and time-based assessment of the operating state of multiple servers. In some implementations, the GUI is configured to display a respective timeline for each of a plurality of servers. Each timeline has a graphical time block for each of the plurality of time periods. Each time block has a graphical indication that describes the operating state of the server during the corresponding time period.

In some implementations, the time blocks are color-coded, with a respective color for each of the possible states of operation. In some implementations, the time blocks are texture-coded, with a respective texture for each of the three states of operation. Other types of markers, such as icons, may also be used to provide a visual indication of the operating state at each time block in the timelines.

In some implementations, the timelines of the different servers are vertically aligned, such that time blocks associated with the different servers and that correspond to the same time period are vertically aligned. Such alignment may allow timelines to be visually compared/analyzed to distinguish between network-side events affecting multiple servers, server-side events affecting only a single server, or user-side events affecting a single user.

In some embodiments, the GUI includes a mechanism that allows a user to modify the order and/or vertical placement of the timelines in the list. For instance, the GUI may be configured to allow a user to reorder the timelines using a drag-and-drop control. Reordering of timelines may be helpful to allow a user to more closely compare the timelines of two or more servers.

In some embodiments, the GUI is configured to mark ones of the timelines with a graphical marker in response to the timeline being selected by a user. For instance, in some implementations, the graphical marker may be an image of a push pin. The GUI may display the marked/pinned timelines in a separate area of the display. For instance, marked/pinned timelines may be displayed in a first display area and other ones of the timelines in a second display area.

In some embodiments, the GUI is configured to allow a user to save various arrangements/orders of the server timelines. This may allow a user to quickly compare the same servers at a later time without having to repeat the previous rearrangement/ordering operations performed by the user. In some implementations, the GUI includes a first button to save an arrangement/order, a second button to restore the original arrangement/order, and/or a third button to load a previously saved arrangement/order.

The processing circuit that provides the GUI may also be configured to monitor the servers and/or determine the operating states of servers. In some implementations, the operating states of the servers may be determined by a separate processing circuit, such as a network monitor. In some implementations, the servers may be configured to determine their operating state and provide the determined operating state data to the GUI.

As indicated above, various criteria may be used to determine the state in which a server is operating. In some embodiments, a single criterion may be used to determine the operating states of the servers. In some other embodiments, the operating state of each of the servers may be determined according to a respective set of criteria indicated in an account settings file associated with a customer account. The sets of criteria may be configured, based on user requirements, to include a number of different conditions to detect various operating states. In some embodiments, the apparatus may provide a web-based GUI that may be used to adjust the criteria indicated in the settings file.

Turning now to the figures, FIG. 1 shows a telecommunication network including a plurality of computing servers (140, 142, 146), each configured to provide remote services to various end-point devices including, for example, mobile devices 120, plain-old telephones (POTS) 122, computer(s) 126, and IP phones 128. The computing servers may provide a variety of different remote services. In this example, the network includes a VoIP server 140, a virtual desktop server 142, and an application server 146. The application server may be a virtual private server or an enterprise service, for example. Data transactions related to the remote services are communicated between the computing servers and the remote users over various data networks including, for example, the Internet 112, public service telephone networks 102, wireless networks 104 (e.g., GSM, CDMA, or LTE), and private data networks, including, but not limited to LAN 130, WiFi network 124, and/or Private Branch Exchange servers (not shown).

In this example, the computing servers (140, 142 and 146) are monitored by a processing circuit 150, which is communicatively-coupled thereto. The communicative-coupling of the computing servers (140, 142 and 146) and the processing circuit 150 may include either a direct connection or an indirect connection having, e.g., multiple connections, relay nodes, and/or networks in a communication path between the computing servers and the processing circuit 150. The processing circuit 150 is configured to determine/retrieve an operating state of each of the computing servers for multiple time periods. The determination/retrieval of the operating state(s) may be performed, for example by an analysis circuit 154 included in the processing circuit 150. The processing circuit 150 also includes an interface circuit 152 configured to provide a GUI that is configured to display a timeline for each of the servers. The timelines include graphical indications of the operating states of the servers in the multiple time periods and are displayed simultaneously. The GUI may also provide a mechanism for a user to rearrange or reorder the displayed timelines for visual comparison/analysis. In some embodiments, the analysis circuit 154 and/or the interface circuit 152 may be implemented as processes executed by one or more processors.

Figure 2A:
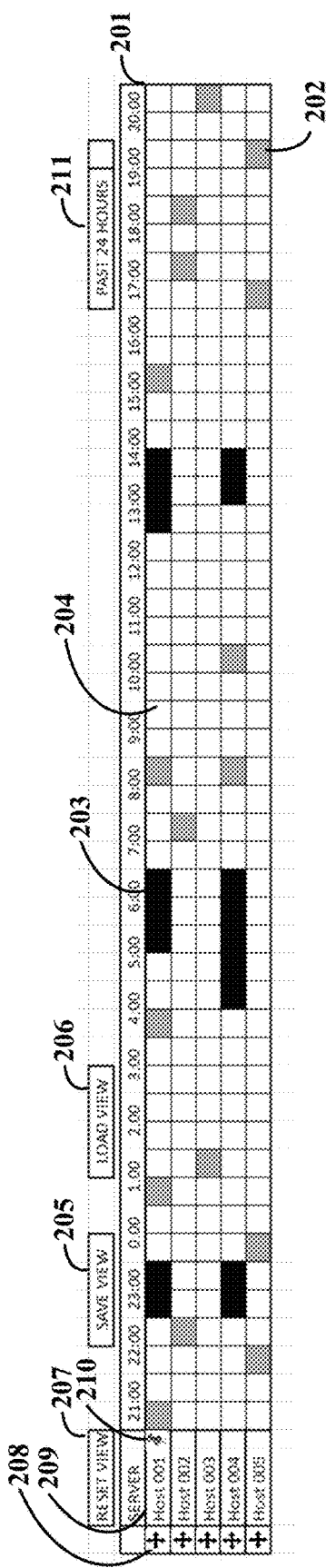
FIG. 2A shows a first GUI, in accordance with one or more implementations.

FIG. 2A shows a first graphical user interface (GUI), in accordance with one or more implementations. The GUI includes a main/primary container 201 for the simultaneous display of operating state timelines of multiple servers. Each timeline includes a set of time blocks in a respective row. As explained above, each time block includes a graphical indication of the operating status of the server for the corresponding time period. In this example, the time blocks indicate one of three possible operating states: up, warning, and down. Time block 202 shows a time block having a color/pattern (lined) indicative of the warning state. Time block 203 shows a time block having a color/pattern (solid black) indicative of the down state. Time block 204 shows a time block having a color/pattern (solid white) indicative of the up state. The color/pattern coding in this example is provided for explanation purposes only. The examples and embodiments may be adapted to use other color/pattern codings to indicate the various possible operation states of the servers. In this example, each timeline is preceded by a title cell 209 indicating the name of the server whose status is displayed in the timeline.

In this example, the GUI includes a time-scale configurator dropdown 211 that can be used to select different timescales (e.g., 1 hour, 24 hours, 1 week, 1 month) to display. The time-series data will go through a map-reduce algorithm and the reference header time labels will change to resize the time blocks, corresponding to the selected time period, for display.

The GUI includes a clickable/draggable handle 208 for each row that may be used by a user to reorder the displayed timelines, via a drag-and-drop mechanism. Sorting rows makes it possible for a network operator to see correlation visually across a very large set of aligned time series data.

The GUI includes a set of buttons for saving, restoring, and resetting the arrangement/view of the timelines in the displayed list of timelines. In some implementations, the GUI includes a clickable button 205, which invokes a drop down dialog allowing the user to name the current arrangement/view and save it for later use. The GUI also includes a second clickable button 206, which invokes a drop down for selecting and opening a saved arrangement/view selection. In this example, the GUI also includes a clickable button 207 that resets the view back to the original order and scale.

In some implementation, the GUI is also configured to mark title cells 209 that are selected by a user. For instance, when the user hovers over a title cell, the color changes slightly and a clickable push pin icon 210 appears in the cell. When the push pin icon 210 is clicked, this row will be moved to the top of the list of timelines.

Figure 2B:
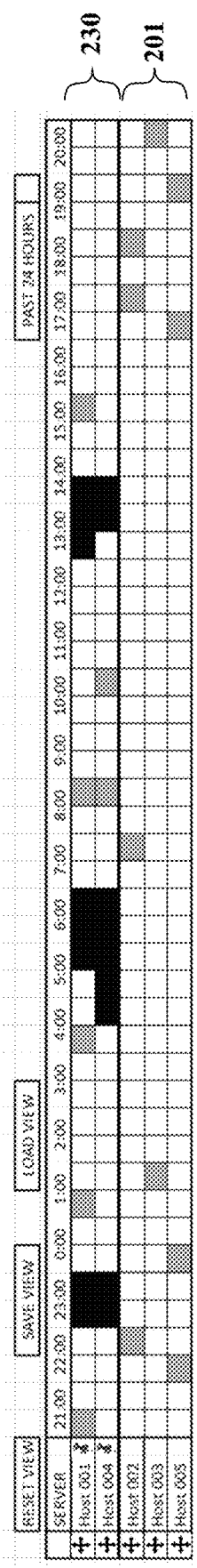
FIG. 2B shows a second GUI, in accordance with one or more implementations.

FIG. 2B shows a second graphical GUI, in accordance with one or more implementations. The second GUI is similar to the GUI shown in FIG. 2A but includes a second display area 230 for display of timelines selected by clicking the push pin icon 210 discussed with reference to FIG. 2A. The display area 230 always appears at the top of the table and expands as additional timelines are selected. In some implementations, as the user scrolls down the page, the display area 230 remains at the top of the browser window, so that the user can quickly compare the pinned timelines in area 230 to timelines in the original set. When a timeline is selected/pinned, it may be hidden from the original set displayed in a second area below area 230. A timeline may be added back to the original set when it is unpinned by a user again clicking on the push pin icon 210. The user can sort the items inside the pinned set.

Figure 3:
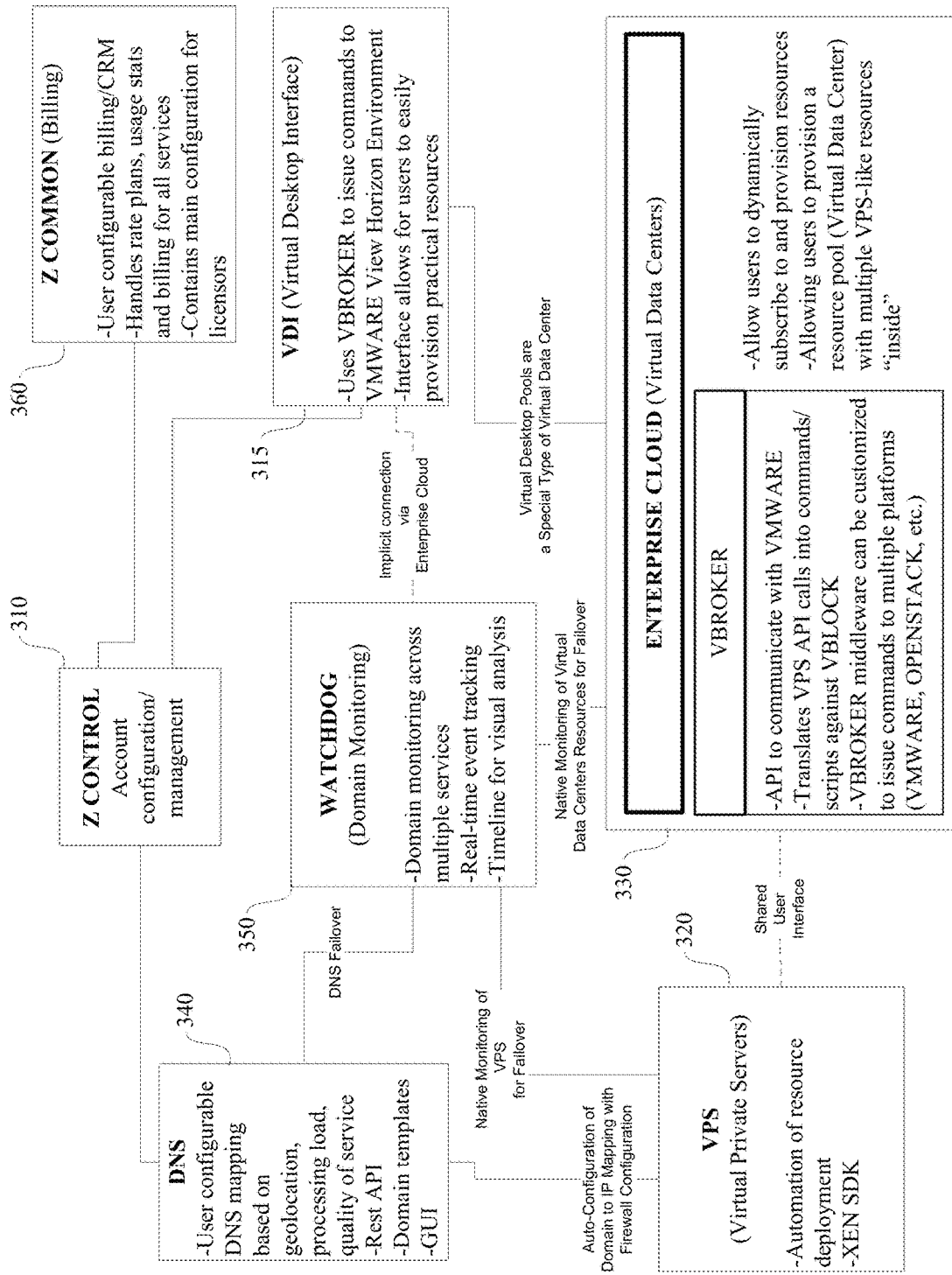
FIG. 3 shows a block diagram of an example system configured to provide respective groups of virtual services for a number of accounts, in accordance with one or more implementations.

FIG. 3 shows a block diagram of an example system configured to provide respective groups of virtual services for a number of accounts, and provide customizable billing for each account. FIG. 3 shows various subsystems included in the example system (Z_system). The system includes multiple subsystems configured to provide respective virtual servers/services for various user accounts. For example, the system includes a first subsystem virtual desktop interface (VDI) 315, which is configured to provide virtual desktops for accounts subscribing to the service. Virtual desktops allow end-users to remotely connect to and run applications on a virtual desktop computer. The VDI subsystem provides a non-technical interface for authorized end-users of an account to provision virtual resources. In some implementations, the VDI subsystem 315 uses a subsystem VBROKER to issue commands to VMWARE View Horizon Environment. VBROKER is a full VMARE view software development kit (SDK) that provides the ability to run custom Windows Powershell scripts against a VMWARE View Horizon server in order to create, manage and synchronize information about desktop pool resources of the system. VBROKER may also be applicable to other subsystems shown in FIG. 3, as well as various other applications utilizing VMWARE.

The system also includes a second subsystem Virtual Private Servers (VPS 320), which can be configured to virtualize various servers for an account. In some implementations, the VPS subsystem 320 automates deployment of resources allocated for an account. For instance, the VPS may provide various virtual servers/services including, but not limited to, file servers, email servers, web hosting, and virtual meeting services (e.g., VoIP), etc. In some scenarios, the VPS may be accessible by virtual desktops (via VDI), by external computers (via the internet), or both. In some implementations, the virtual servers/services provided by the VPS system 320 may be configured using a SDK such as XEN. The SDK may be used, for example, to customize and/or maintain virtual services provided by the VPS system for an account.

The system shown in FIG. 3 also includes a third subsystem (Enterprise Cloud) 330 that is configured to provide a virtual data center for an account. The Enterprise Cloud subsystem 330 allows users to dynamically subscribe to provision resources (e.g., virtual servers/services). Users may create a virtual data center having a pool of resources, which may include a number of VPS-like servers/services. For each account, a respective virtual data center may be configured to include a number of VPS and/or virtual desktops connected in any number of different configurations. For instance, a virtual data center may include a plurality of redundant virtual file servers and a virtual load balancer that routes traffic to balance traffic load of the virtual file servers. The virtual data center may include a firewall between a network and the virtual data center. Additionally or alternatively the virtual data center may include firewalls to protect individual virtual servers/desktops in the virtual data center.

In some implementations, the virtual data center for an account includes a group of virtual desktops and/or virtual servers indicated in respective settings files for the account. The virtual desktops and/or virtual servers in the virtual data center may be provided by the VDI and VPS subsystems 315 and 320 via a shared user interface. The settings file for each account may include server settings for each virtual desktop and/or virtual servers included in the respective virtual data center. The server settings may include a pointer to a VMWARE image and also specify computing resources to dedicate to execution of the corresponding virtual desktops and/or virtual servers. The virtual servers may provide various types of services including, for example, file servers, email servers, web hosting, virtual meeting services (e.g., VoIP), billing, and/or remote computing services, routing, load balancing, and/or switch board services (e.g., Private Branch Exchange).

The virtual desktops and/or virtual servers are interconnected in the virtual data center according to data center configuration settings included in the respective settings files for the account. During operation, the computing services emulate the virtual data center by emulating the virtual desktops and/or virtual servers indicated in the server settings and also emulating the virtual connections specified in the data center configuration settings. In some implementations, emulation of the virtual data center includes execution of a resource management process, configured to assign computing resources allocated for the data center for emulation of the virtual desktops, virtual servers, and connections of the data center.

In some implementations, the virtual data center provides a perimeter firewall between an internal network of the virtual data center and an external network. The perimeter firewall may provide network protection for the virtual data center with stateful packet inspection, access-control lists, NAT and VPN. In some implementations, the virtual data center may also include individual firewalls isolating one or more virtual servers/desktops from other virtual servers/desktops in the virtual data center. In some implementations a web-based graphical user interface (GUI) is provided for configuration of access rules enforced by the firewall(s) which may include, for example, whitelists or blacklists of services to pass/block and/or users or IP addresses to allow access. The GUI may also be used to configure internet access rules for public facing applications, or to create one or more VPN tunnels connecting one or more end-user networks to the virtual data center.

In some implementations, the virtual data centers run on a VMWARE platform leveraging a fault tolerant storage area network (SAN). In some implementations, the Enterprise Cloud subsystem 330 uses VBROKER to issue commands to VMWARE hosting the virtual servers/desktops. VBROKER provides an application program interface (API) to communicate with VMWARE. For example, VBROKER may translate VPS API calls into commands/scripts against VBLOCK. VBROKER may be used as middleware to issue commands to various platforms (e.g., VMWARE or OPEN-STACK).

VMWARE vSphere availability features may be employed to keep the virtual network, and/or the virtual servers and virtual desktops therein, running in the event of a server failure. Features such as vMotion and storage vMotion may also be used to protect against interruption of service due to hardware failure. In some implementations, the servers providing the virtual data center may include fault-tolerant hard-disk storage. For example, each disk may have two serial attached small-computer system-interface (SAS) connectors attaching it to diverse storage processors inside the storage area network. The dual SAS connections allow the storage area network to see the disks on separate data paths and, in the event of a failure, reroute the storage operations through an available path with no noticeable performance impact. In addition, the potential for data loss or corruption due to a bus reset is completely eliminated. The disks themselves reside in storage shelves with redundant power supplies, and cabling attaching the disks to the multiple storage processors. As redundancy is built into the system, redundant virtual servers are not needed to achieve system fault tolerance in the virtual data center.

In some implementations, each account may be allocated a dedicated amount of computing resources of a plurality of computing servers (e.g., in a cloud). For instance, each account may be provided with a certain number of CPU cores, memory, storage, and/or bandwidth, which are dedicated to the account. The pre-allocation of dedicated resources improves reliability in high-traffic conditions.

In some implementations, the plurality of computing servers is also configured to provide a GUI for adjusting configuration settings of the data center. For example, the GUI may provide an interface for an authorized user of the account to configure virtual desktops, virtual servers, connections, and/or settings of the virtual data center. For instance, the GUI may provide an interface to assign a subset of available computing resources (e.g., processing cores/time, memory or storage) for the account to particular virtual desktops and/or virtual servers in the data center. The GUI may also provide a mechanism to import and/or replicate virtual machines in the data center. In some implementations, the GUI may provide the ability to save a backup or snapshot of the layout and configuration of the virtual data center.

The system shown in FIG. 3 also includes a domain name server (DNS) subsystem 340. The DNS subsystem is configured to dynamically map each domain name associated with an account to an IP address of a select virtual server or service provided for the account. For each account, the mapping of domain names is performed according to a respective set of mapping criteria indicated in a settings file of the account.

As indicated above, various mapping criteria may be utilized by the various accounts to map the domain names to the virtual servers/services. For example, the mapping criteria may map domain names as a function of the operating status of the virtual servers/services, processing load of the virtual servers (e.g., load balancing), network traffic conditions (e.g., latency and bandwidth), quality of service requirements, geographical location of an end-user submitting a DNS query, permissions of the end user, date or time of the DNS query, type of virtual server associated with the domain name, and/or number of servers associated with the domain name. In some implementations, the system provides a web-based GUI configured and arranged to allow one or more authorized users for the account to adjust the mapping criteria indicated in the settings file.

In some implementations, the DNS subsystem 340 performs the mapping of the domain name associated with an account according to a respective set of mapping criteria indicated in a settings file of the account. For each account, the DNS subsystem 340 may map domain names to IP addresses of the virtual servers according to various mapping criteria. For example, in some implementations, the mapping criteria may cause the DNS subsystem 340 to map domain names based on the operating status of the virtual servers. For instance, the mapping criteria may map a domain name to a first virtual server while the first virtual server is operating correctly. In response to the first server going down, the mapping criteria may map the domain name to a backup virtual server. As another example, the mapping criteria may cause the DNS subsystem 340 to map domain names based on processing load of the virtual servers. For instance, domain names may be mapped to balance processing load between a plurality of virtual servers. In some implementations, the mapping criteria may cause the DNS subsystem 340 to map domain names based on the geographical location of the user submitting a domain name query to the DNS subsystem 340.

Various implementations may additionally or alternatively use other criteria for mapping of domain names including, but not limited to, date or time of the DNS query, type of virtual server associated with the domain name, number of servers associated with the domain name, and/or permissions of user submitting the DNS query.

In various implementations, a respective set of mapping criteria may be used for each account. This allows the domain names mapping criteria to be customized for the particular needs and services of each account. In some implementations, the DNS subsystem 340 provides a representational state transfer (REST) API for configuration of DNS mapping for an account. In some implementations domain templates, having various preconfigured mapping criteria, may be provided for easy configuration of the DNS subsystem 340 for an account. In some implementations, the DNS subsystem 340 auto-configures mapping based on virtual services provided for the account by the other subsystems (e.g., 315, 320 and/or 330).

In some implementations, the DNS subsystem 340 provides a web-based GUI configured and arranged to allow one or more authorized users of the account to adjust the mapping criteria indicated in the settings file. An authorized user may specify a single set of mapping criteria for all virtual servers associated with the account or may specify a different set of mapping criteria for different types of virtual servers or for different virtual servers of the same type. Further, an authorized user may specify different sets of mapping criteria for different departments or users associated an account.

In this example, the system also includes a fourth subsystem (Watchdog) 350 configured to monitor status of the virtual servers/services provided for the various accounts. The Watchdog subsystem 350 is configured to determine the operating status of the virtual servers/services provided for each account. For instance, Watchdog subsystem 350 may be configured to monitor services provided by the other subsystems (e.g., 315, 320 and/or 330) for fall over. Watchdog subsystem 350 may provide domain monitoring across multiple services. The Watchdog subsystem 350 may provide real-time event tracking for the services for each account.

In some implementations, the Watchdog subsystem 350 provides a GUI for display and analysis of the operating status of virtual servers/services provided for an account. In some implementations, the GUI is configured to display a respective timeline for each of a plurality of servers. Each timeline may have graphical time blocks for each of the plurality of time periods. Each time block has a graphical indication that describes the operating state of the server during the corresponding time period. The timelines may be rearranged by a user for visual comparison and analysis of the operating state of the virtual servers/services. Such visual analysis may be useful, for instance, for distinguishing between network events affecting multiple servers, and server events affecting an individual server.

Consistent with the above described examples, in some implementations, the Watchdog subsystem 350 may be configured to provide an alert to one or more authorized users of the account if the operating status of the virtual servers/services satisfies alert criteria indicated in an alert policy for the account. The Watchdog subsystem 350 may provide alerts using various messaging mechanisms including, for example, SMS text messages, automated phone calls, emails, and/or other messaging services (e.g., Facebook, Myspace, Twitter, and/or Instant Messengers). In some implementations, multiple notifications are sent to multiple recipients and/or use multiple types of messages. In some implementations, the GUI for adjusting mapping criteria may also be used to adjust the trigger conditions and/or alert message options.

In some implementations, the DNS subsystem 340 is configured to map domain names to the virtual servers/services based on the operating statuses of the virtual servers/services, as determined by the Watchdog subsystem 350. For example, the DNS subsystem may be configured to remap a domain name from a first virtual server to a backup virtual server in response to the first virtual server becoming unresponsive.

The system shown in FIG. 3 also includes a subsystem (Z Common) 360 configured to provide billing for various services provided for an account. The subsystem handles rate plans, usage statistics, and billings for various services of the system. The Z Common subsystem 360 may bill services using flat rates for specified time-periods (e.g., a monthly rate), or using usage rates indicating a specified billing rate for a specified amount of use (e.g., time, amount of data, and/or number of users). The Z Common subsystem 360 is configurable as a plug-and-play component to provide billing services for various independent systems. In some implementations, a GUI is provided for authorized users to manage services, billing options, payment options, account specific alerts, and/or various administrated options. In some implementations, the GUI provides an interface for a user to configure subscription and billing.

The system includes a subsystem (Z Control) 310, which configures settings of one or more of the subsystems for respective accounts of the system. In some implementations, the Z Control subsystem 310 stores data indicating services, provided by the various subsystems (e.g., 315, 320, 330, 340, and/or 350), which are subscribed to for each account. The Z Control subsystem 310 may further store user-configurable settings for the subscribed to services for each respective account. For example, the settings for an account may indicate settings for one or more virtual servers provided for the account by the VPS subsystem 320. In some implementations, the Z Control subsystem 310 may provide a GUI for authorized users of an account to manage virtual services subscriptions, and/or various administrated options.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a computing server, a network monitor, and/or a GUI). For example, in certain of the above-discussed embodiments, one or more modules are discrete logic circuits or programmable logic circuits configured and arranged for implementing these operations/activities, as in the blocks shown in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

The various embodiments described above are provided by way of illustration only and should not be construed to limit the disclosure. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features from another figure even though the combination is not explicitly shown or explicitly described as a combination. The disclosure may also be implemented using a variety of approaches such as those involving a number of different circuits, operating systems, and/or software programs/packages. Such modifications and changes do not depart from the true spirit and scope of the present disclosure, including that set forth in the following claims.

What is claimed is:

1. A method comprising:
providing, via one or more data-communication servers and via one or more broadband networks including the Internet, data-communication services to recipients having respective accounts associated with use of the data-communication services and, for one or more of the respective accounts, to permit the recipients to designate, for at least one of provisioning and deploying, certain resources available from a system including the one or more data-communication servers; and
generating for one or more of the certain resources, via processing circuitry, graphical-user data that includes information to display a timeline having a graphical indication corresponding to an operating state for a corresponding time period and further to display graphical markers which are aligned visually to indicate comparisons between two or more of the following: network-side events affecting multiple servers of the system, server-side events affecting only a single server, and user-side events affecting a single user.

2. The method of claim 1, wherein the certain resources include virtual servers including at least one of: a redundant virtual file server, and virtual load balancer.

3. The method of claim 1, wherein the processing circuitry provides an alert in response to satisfaction of operating state criteria defined in an alert policy, and wherein the alert policy is defined in an account profile linked to one of the respective accounts.

4. The method of claim 1, wherein said certain resources include virtual servers among which at least one is a redundant virtual file server and at least one other is a virtual load balancer.

5. The method of claim 1, wherein the system includes a virtual data center subsystem allowing, for one or more of the respective accounts, the recipients to dynamically subscribe to provisionable resources.

6. The method of claim 1, further including a graphical user interface (GUI) that displays the graphical markers, and wherein the processing circuitry provides an alert in response to satisfaction of operating state criteria defined in an alert policy, and wherein the alert policy is indicated in an account-settings file associated with one of the respective accounts and is accessible by an account user via the GUI.

7. The method of claim 1, wherein the processing circuitry reestablishes mapping of one or more domain names used on behalf of one or more of the respective servers of the system, to use a backup or alternative server, in response to an indication that one of the one or more data-communication servers is operating responsively but exceeding a proper operation threshold.

8. The method of claim 1, wherein the processing circuitry provides an alert in response to the one or more data-communication servers of the system operating responsively but exceeding a proper operation threshold.

9. A computer-readable device including instructions which, in response to being executed by computer circuitry, causes the following steps to be carried out, the steps comprising:
providing, via one or more broadband networks, data-communication services to recipients having respective accounts associated with use of the data-communication services and, for one or more of the respective accounts, to permit the recipients to designate, for at least one of provisioning and deploying, certain resources available from a system including servers that provide the data-communication services; and
generating for one or more of the certain resources, graphical-user data that includes information to display a timeline having a graphical indication corresponding to an operating state for a corresponding time period and further to display graphical markers which are aligned visually to indicate comparisons between two or more of the following: network-side events affecting multiple servers, server-side events affecting only a single server, and user-side events affecting a single user.

10. A system comprising:
cloud-based data-communication servers, to provide over one or more broadband networks including the Internet, data-communication services to recipients having respective accounts associated with use of the data-communication services and, for one or more of the respective accounts, to permit the recipients to designate, for at least one of provisioning and deploying, certain resources available from the system; and
processing circuitry to generate, for one or more of the certain resources, graphical-user data that includes information to display a timeline having a graphical indication corresponding to an operating state for a corresponding time period and further to display graphical markers which are aligned visually to indicate comparisons between two or more of the following: network-side events affecting multiple servers of the system, server-side events affecting only a single server, and user-side events affecting a single user.

11. The system of claim 10, further including a graphical user interface to display the graphical markers.

12. The system of claim 10, further including a GUI (graphical user interface) to display the graphical markers, and a virtual data center subsystem to use the GUI for visualizing data relating to two or more of the following: network-side events affecting multiple servers, server-side events affecting only a single server, and user-side events affecting a single user.

13. The system of claim 10, further including a GUI (graphical user interface) to display the graphical markers, and a virtual data center subsystem to allow the recipients to dynamically subscribe to provisionable resources, from among the certain resources, and to use the GUI for visualizing data relating to two or more of the following: network-side events affecting multiple servers, server-side events affecting only a single server, and user-side events affecting a single user.

14. The system of claim 10, further including a virtual data center subsystem to allow the recipients to dynamically subscribe to provisionable resources from among the certain resources and to permit the recipients to automatically provision or deploy certain virtual resources.

15. The system of claim 10, wherein the graphical indication includes a coded marker having a visual indicator to indicate at least one of a plurality of operating states respectively associated with provisionable resources, from among the certain resources, which include servers and wherein operating state data indicates at least one of the servers is operating responsively but exceeding a proper operation threshold corresponding to at least one of: traffic load, latency, processing time, memory usage, and a quantitative measure indicating an extent to which the server is not operating correctly.

16. The system of claim 10, further including a server monitoring circuit communicatively to monitor at least some operating states of the provisionable resources and provide corresponding operating-state data to the processing circuitry.

17. The system of claim 10, further including a communication circuit to provide an alert in response to satisfaction of operating state criteria defined in an alert policy, wherein the alert policy is defined in an account profile linked to one of the respective accounts.

18. The system of claim 10, wherein the processing circuitry is further to reestablish domain name server (DNS) mapping of one or more domain names used on behalf of the respective servers, to use a backup or alternative server, based at least in part on at least one of the servers operating responsively but exceeding a proper operation threshold.

19. The system of claim 10, further including a domain name server subsystem to dynamically map each of a plurality of domain names, associated with each account, to an IP address of a selected virtual server or service provided for one of the respective accounts.

20. The system of claim 10, wherein the processing circuitry is to, for each of the certain resources, retrieve data associated with the operating state, and wherein the certain resources include at least one of: one or more servers, a redundant file server, and a load balancer.

\* \* \* \* \*